(12) United States Patent
Rössl et al.

(10) Patent No.: US 10,734,128 B2
(45) Date of Patent: Aug. 4, 2020

(54) DIFFERENTIAL PHASE-CONTRAST IMAGING WITH FOCUSSING DEFLECTION STRUCTURE PLATES

(75) Inventors: Ewald Rössl, Henstedt-Ulzburg (DE); Thomas Koehler, Norderstedt (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1031 days.

(21) Appl. No.: 13/982,781

(22) PCT Filed: Jan. 30, 2012

(86) PCT No.: PCT/IB2012/050418
§ 371 (c)(1),
(2), (4) Date: Jul. 31, 2013

(87) PCT Pub. No.: WO2012/104770
PCT Pub. Date: Aug. 9, 2012

(65) Prior Publication Data
US 2013/0315373 A1  Nov. 28, 2013

(30) Foreign Application Priority Data

Feb. 1, 2011 (EP) .................................... 11152853

(51) Int. Cl.
*G01N 23/04* (2006.01)
*G21K 1/06* (2006.01)

(52) U.S. Cl.
CPC ............ *G21K 1/065* (2013.01); *G01N 23/04* (2013.01); *G21K 1/06* (2013.01); *G21K 2207/005* (2013.01)

(58) Field of Classification Search
CPC .... G21K 1/06; G21K 1/065; G21K 2207/005; G01N 23/04; A61B 6/484

(Continued)

(56) References Cited

U.S. PATENT DOCUMENTS

2007/0183584 A1*  8/2007  Baumann ............... A61B 6/484
                                                      378/145

FOREIGN PATENT DOCUMENTS

WO    WO2004071298       8/2004
WO    2008102632 A1      8/2008
(Continued)

OTHER PUBLICATIONS

Partial English Machine Translation of Tamakoshi (WO2008102632).*

Primary Examiner — Courtney D Thomas
(74) Attorney, Agent, or Firm — Larry Liberchuk

(57) ABSTRACT

The present invention relates to X-ray differential phase-contrast imaging, in particular to a deflection device for X-ray differential phase-contrast imaging. In order to provide differential phase-contrast imaging with improved dose efficiency, a deflection device (28) for X-ray differential phase-contrast imaging is provided, comprising a deflection structure (41) with a first plurality (44) of first areas (46), and a second plurality (48) of second areas (50). The first areas are provided to change the phase and/or amplitude of an X-ray radiation; and wherein the second areas are X-ray transparent. The first and second areas are arranged periodically such that, in the cross section, the deflection structure is provided with a profile arranged such that the second areas are provided in form of groove-like recesses (54) formed between first areas provided as projections (56). The adjacent projections form respective side surfaces (58) partly enclosing the respective recess arranged in between. The side surfaces of each recess have a varying distance (60) across the depth (62) of the recess.

24 Claims, 11 Drawing Sheets

(58) Field of Classification Search
USPC .......................... 378/62, 145, 149, 154, 156
See application file for complete search history.

(56) References Cited

FOREIGN PATENT DOCUMENTS

| WO | 2008102654 A1 | | 8/2008 | |
|---|---|---|---|---|
| WO | WO2010/082688 | * | 7/2010 | .............. G21K 1/06 |
| WO | WO2010082688 | | 7/2010 | |

* cited by examiner

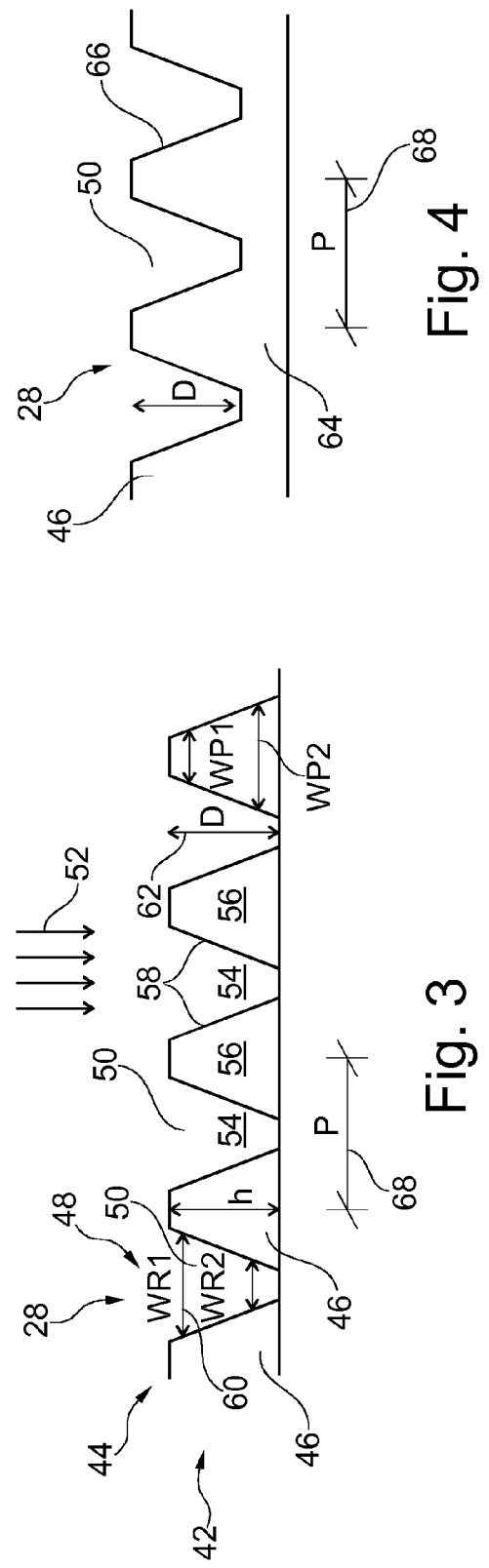
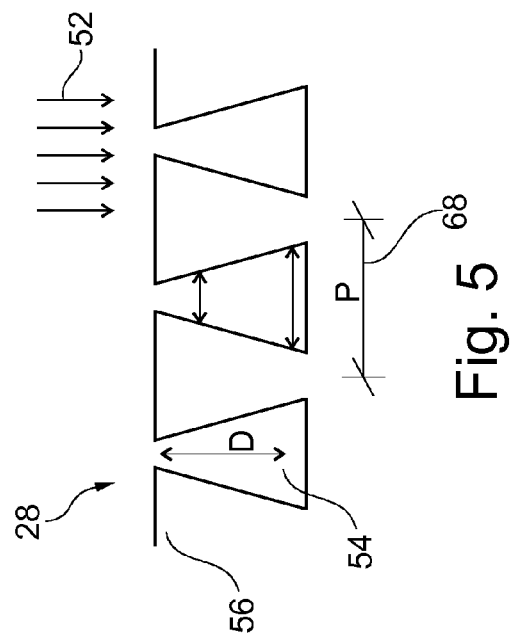

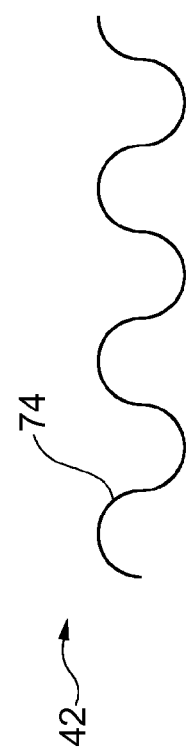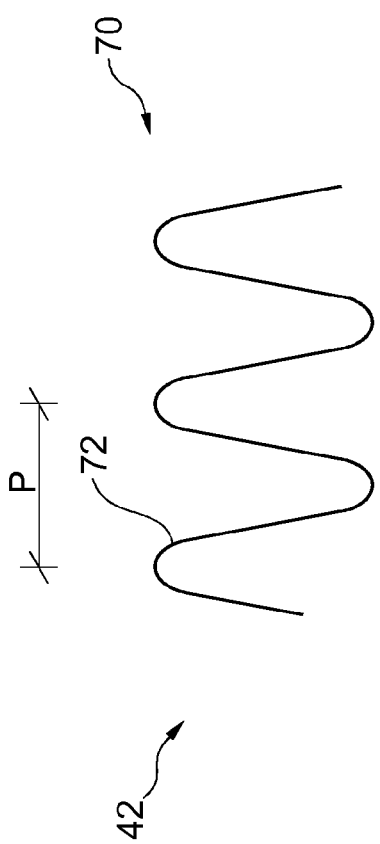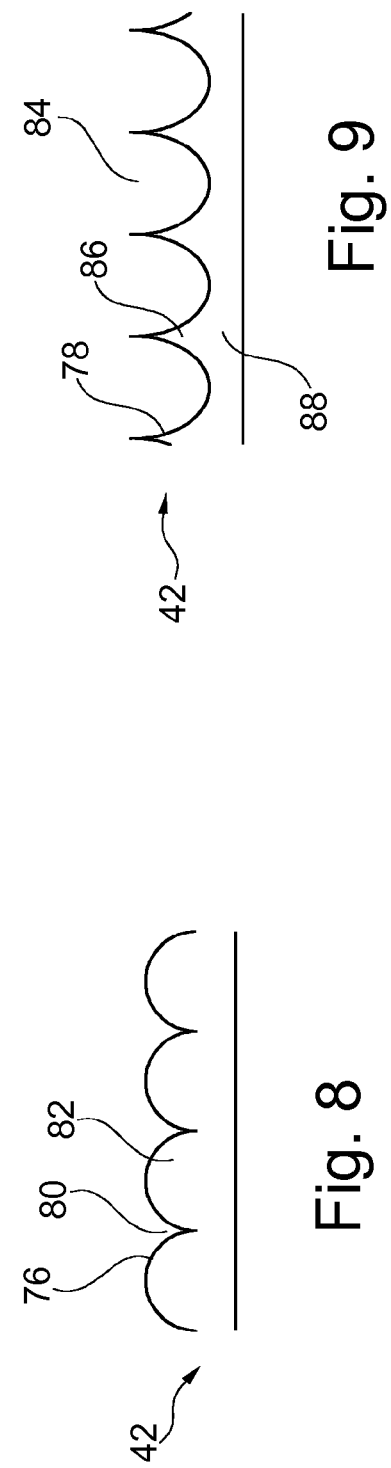

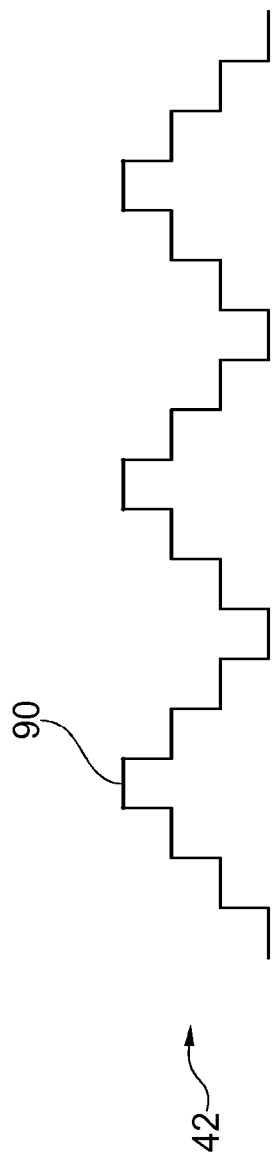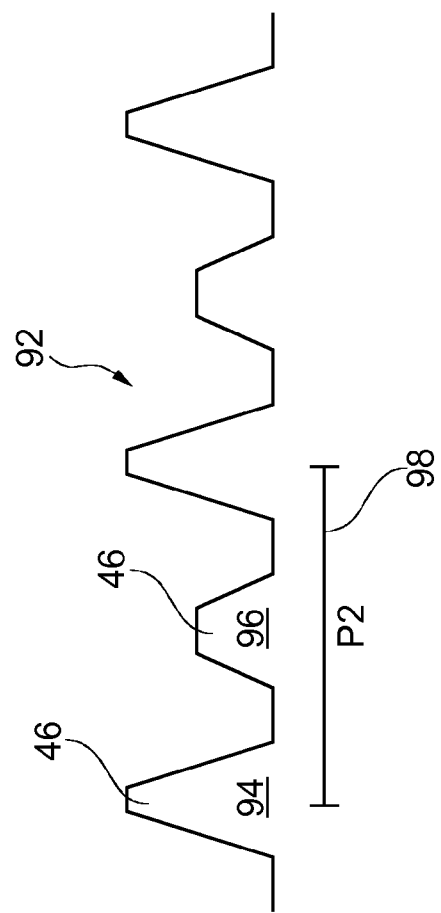

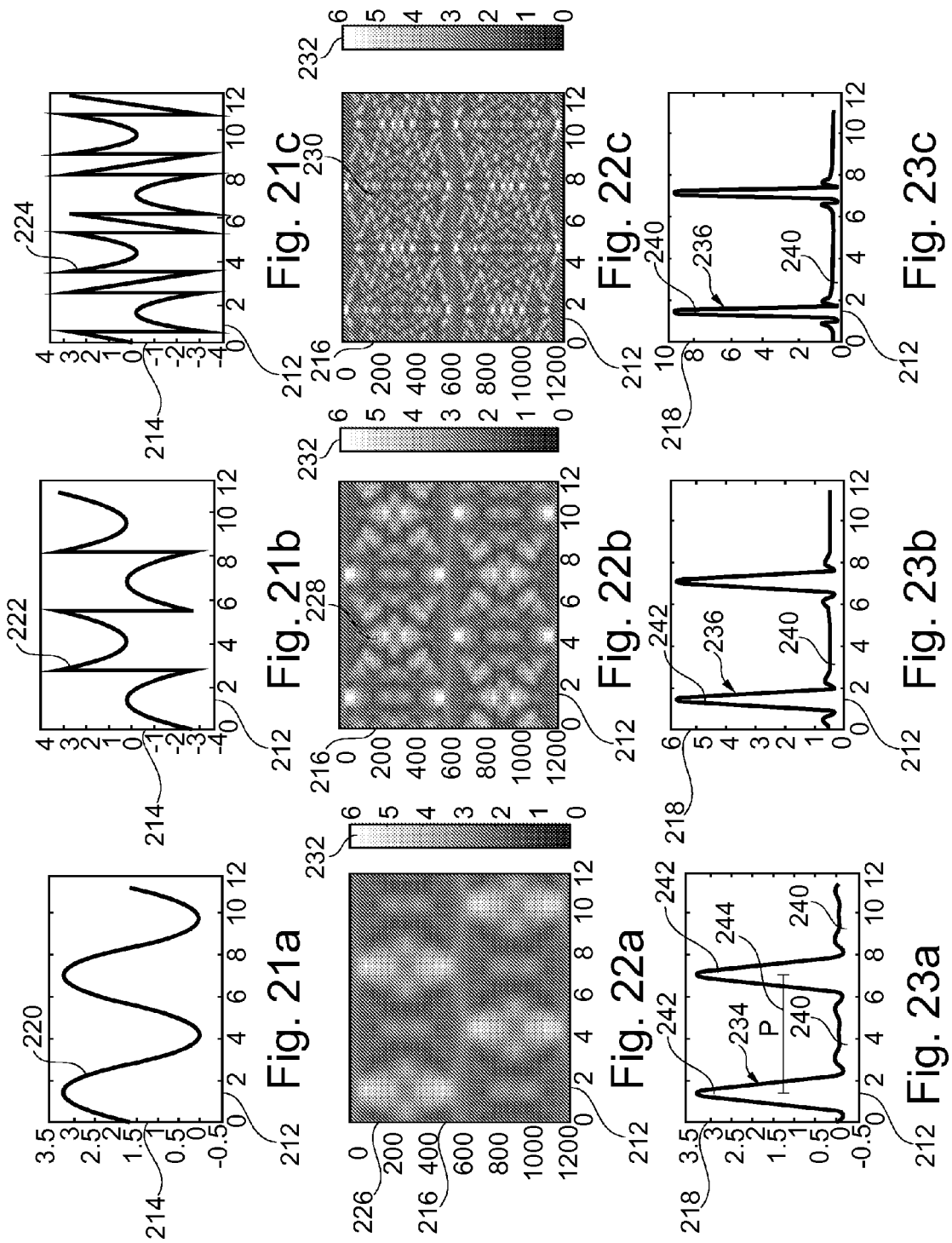

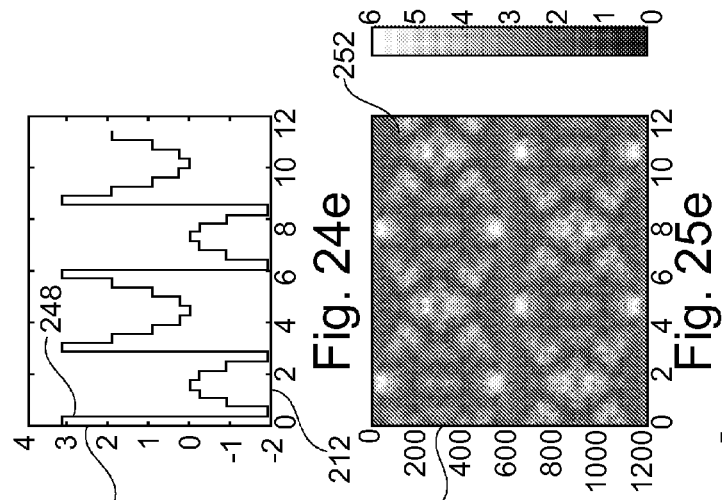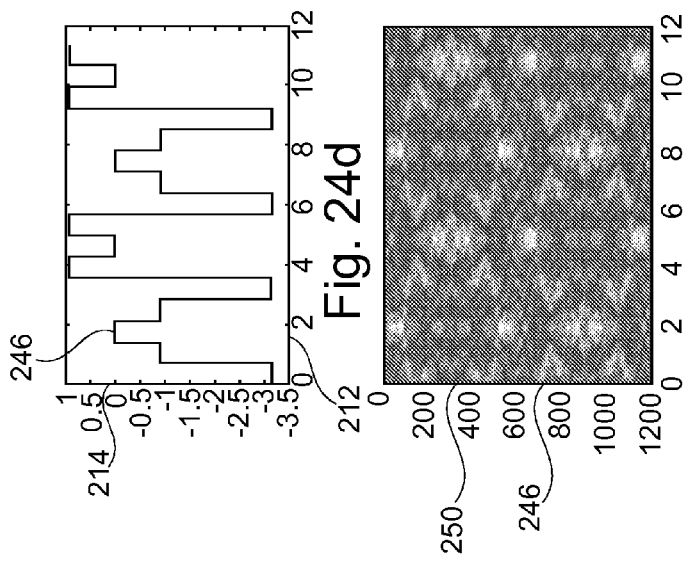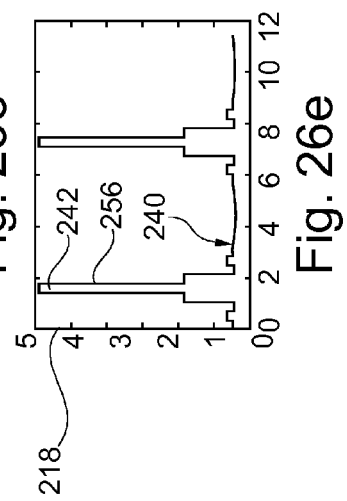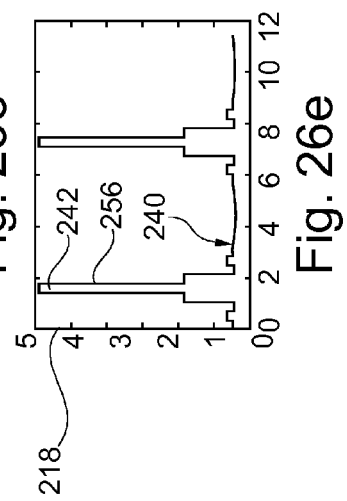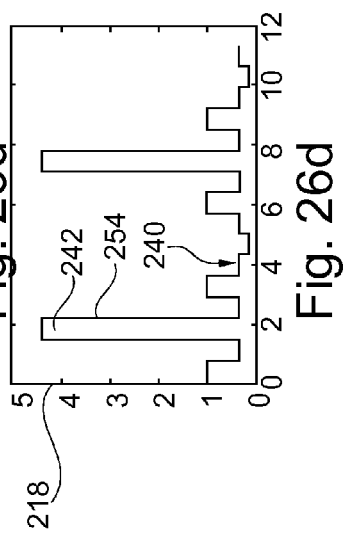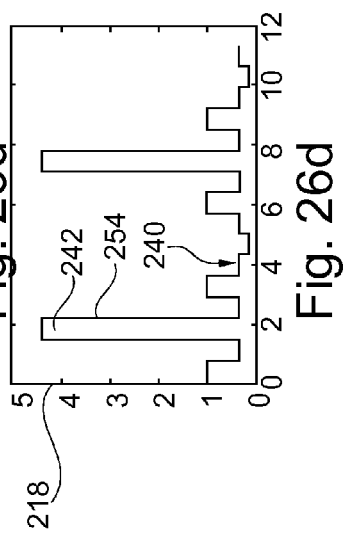

DIFFERENTIAL PHASE-CONTRAST IMAGING WITH FOCUSSING DEFLECTION STRUCTURE PLATES

CROSS-REFERENCE TO PRIOR APPLICATIONS

This application is the U.S. National Phase application under 35 U.S.C. §371 of International Application Serial No. PCT/IB2012/050418, filed on Jan. 30, 2012, which claims the benefit of European Application Serial No. 11152853.5, filed on Feb. 1, 2011. These applications are hereby incorporated by reference herein.

FIELD OF THE INVENTION

The present invention relates to X-ray differential phase-contrast imaging, in particular to a deflection device for X-ray differential phase-contrast imaging, an absorption device of X-ray differential phase-contrast imaging, a detector arrangement of an X-ray system for generating phase-contrast images, an X-ray image acquisition device and an X-ray imaging system for differential phase-contrast imaging as well as a method for differential phase-contrast imaging, and a computer program element and a computer-readable medium.

BACKGROUND OF THE INVENTION

In order to enhance contrast of low absorbing specimen, compared to conventional amplitude contrast images, for example, differential phase-contrast imaging is applied. In WO 2004/071298 A1, an apparatus is provided for generating phase-contrast X-ray images, in which, along an optical path, an incoherent X-ray source, a source grating, a phase grating, an analyzer grating and an image detector are provided. Currently, the fringe pattern generated by the phase grating, which is also referred to as grating G1, at the location of the analyzer grating, which is also referred to as grating G2, is probed by the phase stepping technique with an analyzer grating absorbing typically 50% of the radiation that has already passed the object under study. This latter fact is particularly problematic in medical imaging applications, where the largest possible fraction of transmitted radiation through the patient should be detected and contribute to the image signal in the detector.

SUMMARY OF THE INVENTION

The absorption of 50% of the radiation means rather low dose efficiency with respect to the actual dose provided to the detector and thus the dose which is actually used for the image information.

Therefore, there is a need to provide differential phase-contrast imaging with improved dose efficiency.

The object of the present invention is solved by the subject-matter of the independent claims, wherein further embodiments are incorporated in the dependent claims.

It should be noted that the following described aspects of the invention apply also for the deflection device, the absorption device, the detector arrangement, the X-ray image acquisition device, the X-ray imaging system, the method as well as the computer program element and the computer-readable medium, where applicable.

According to an exemplary embodiment of the invention, a deflection device for X-ray differential phase-contrast imaging is provided with a deflection structure. The deflection structure comprises a first plurality of first areas and a second plurality of second areas. The first areas are provided to change the phase and/or amplitude of an X-ray radiation, and the second areas are X-ray transparent. The first and second areas are arranged periodically such that, in the cross section, the deflection structure is provided with a profile arranged such that the second areas are provided in form of groove-like recesses formed between first areas provided as projections. Adjacent projections form respective side surfaces partly enclosing the respective recess arranged in between. The side surfaces of each recess have a varying distance across the depth of the recess.

According to an exemplary embodiment, every period of the deflection structure is adapted to function as a micro-lens structure focussing X-ray radiation such that at a distance from the micro-lens structure intensity maxima are obtained.

According to an exemplary embodiment, an intensity profile is reproduced for the first time at a distance of less than 1/16 of the Talbot distance: $p^2 \cdot s/\lambda$, where p is the transverse period of the deflection structure, and lambda is the wavelength of the x-rays.

According to an exemplary embodiment, the profile of the deflection structure is provided as a parabolic phase profile.

According to an exemplary embodiment, the profile of the deflection structure is provided with a discretized shape.

According to an exemplary embodiment, an absorption device for X-ray differential phase-contrast imaging is provided, comprising an absorption structure with a third plurality of third areas and a fourth plurality of fourth areas. The third areas may alternatively be referred to as the "first absorption areas." The fourth areas may alternatively be referred to as the "second absorption areas." The third areas are X-ray opaque, and the fourth areas are X-ray transparent. Further, the third and fourth areas are arranged periodically such that, in the cross section, the absorption structure is provided with an absorption profile in which the third areas are provided as absorption projections partly enclosing X-ray transparent fillings as the fourth areas in between. The transparent fillings each have a wider cross section than the absorption projections.

According to an exemplary embodiment, a detector arrangement of an X-ray system for generating phase-contrast images of an object is provided, comprising a phase grating, an analyzer grating, and a detector with a sensor adapted to record intensity variations of X-ray radiation. The phase grating is provided as a deflection device according to one of the above-mentioned exemplary embodiments. The analyzer grating is provided as an absorption device according to the above described exemplary embodiment. The phase grating and/or the analyzer grating are adapted to be stepped in a manner transverse to the deflection structure.

According to an exemplary embodiment, an X-ray image acquisition device for generating phase-contrast images of an object is provided, with an X-ray source, a phase grating, an analyzer grating, and a detector. The X-ray source generates X-ray radiation, and the X-ray image acquisition device is adapted to provide an X-ray beam with sufficient coherence, so that interference can be observed at the location of the analyzer grating. The phase grating, the analyzer grating and the detector are provided as a detector arrangement according to the above described exemplary embodiment.

According to an exemplary embodiment, an X-ray imaging system for differential phase-contrast imaging is provided, comprising an X-ray image acquisition device for generating phase-contrast images of an object according to the above described exemplary embodiments, a processing unit, and an interface unit. The processing unit is adapted to control the X-ray source as well as the phase-stepping of the analyzer grating and/or the phase grating. The interface unit is adapted to provide the detected raw image data to the processing unit.

According to a further exemplary embodiment, a method for differential phase-contrast imaging is provided, comprising the steps of:

a) applying at least partly coherent X-ray radiation to an object of interest;

b) applying the X-ray radiation passing the object to a phase grating recombining the splitted beams in an analyzer plane;

c) applying the recombined beams to an analyzer grating arranged in the analyzer plane; and d) recording raw image data with a sensor while transversely stepping the analyzer grating or phase grating with multiple steps with a step size of at most p/(n*k); wherein p is the pitch of the analyzer or phase grating; and wherein k is larger than 1, for example k=2 or k=3.

The phase grating in step b) is a deflection device according to one of the above described exemplary embodiments. The analyzer grating in step d) is an absorption device according to the above described exemplary embodiment. Further, n is the reciprocal of the duty cycle of the analyzer grating, wherein the duty cycle is the ratio of the X-ray radiation stopped by the analyzer grating to the total X-ray radiation hitting the analyzer grating.

It can be seen as the gist of the invention to provide a deflection device as a phase grating with a deflection structure arranged such that deflection effects occur over the entire cross section of the beam. As a consequence of this deflection structure according to the invention, every period of the deflection device functions as a focussing arrangement. Through the effect of the focussing, the duty cycle of the absorption device, i.e. the analyzer grating, can be reduced significantly so that less X-ray radiation is absorbed and more X-ray radiation can be applied to the detector. Thus, improved dose efficiency is provided.

These and other aspects of the present invention will become apparent from and elucidated with reference to the embodiments described hereinafter.

BRIEF DESCRIPTION OF THE DRAWINGS

Exemplary embodiments of the invention will be described in the following with reference to the following drawings.

FIG. 3 schematically shows an embodiment of a deflection device according to the invention.

FIG. 4 shows a further embodiment of a deflection device according to the invention.

FIG. 5 shows a further embodiment of a deflection device according to the invention.

FIGS. 6 to 11 show further exemplary embodiments of a deflection device according to the invention.

FIGS. 21 to 23 show further aspects of exemplary embodiments of the invention.

FIGS. 24 to 26 show further aspects of further exemplary embodiments according to the invention.

DETAILED DESCRIPTION OF EMBODIMENTS

Figure 1:
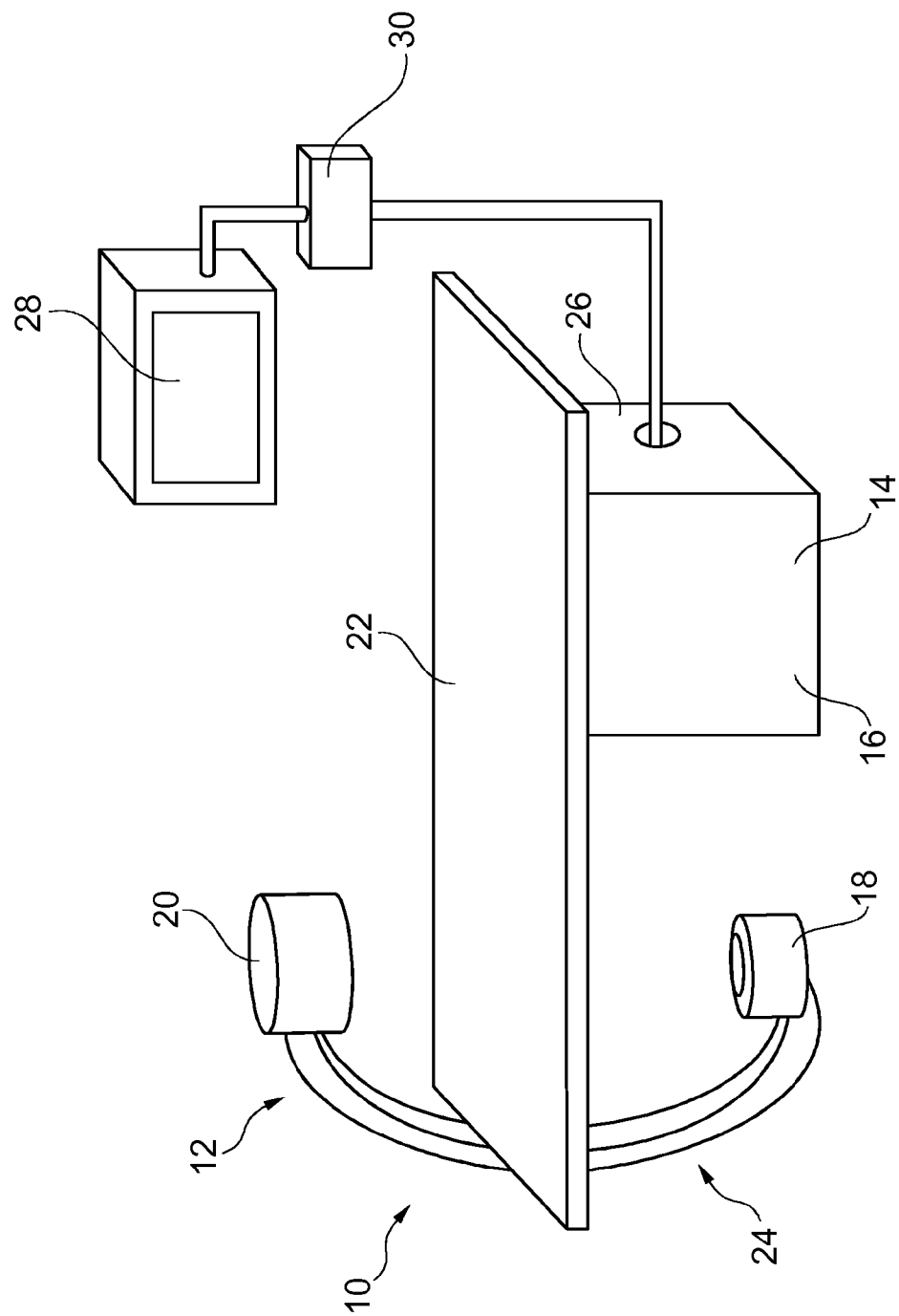
FIG. 1 schematically illustrates an X-ray imaging system according to the invention.

In FIG. 1, an X-ray imaging system 10 for differential phase-contrast imaging is schematically shown. The X-ray imaging system 10 comprises an X-ray image acquisition device 12 for generating phase-contrast images of an object according to one of the embodiments or aspects described below. The X-ray imaging system 10 is further provided with a processing unit 14 and an interface unit 16, of which the latter is not further shown. The X-ray image acquisition device 12 comprises an X-ray source 18 and a detector 20 which is provided as detector arrangement according to the embodiments described below, for example with reference to FIG. 2. As can be seen, in order to receive a subject to be examined a table 22 is arranged. The X-ray source 18 and the detector arrangement 20 are mounted on a C-arm device 24 such that the table can be arranged between the X-ray source 18 and the detector arrangement 20, so that the object can be placed between the X-ray source and the detector.

The C-arm device 24 is provided such that a movement of the X-ray image acquisition device 12 around the patient is possible to be able to adapt the viewing direction. Further, a base 26 is provided on which the table 22 is mounted. The base 26 is located, for example, on the floor of an examination room. As an example, the processing unit 14 and the interface unit 16 are provided within the base 26. Further, a display 28 is arranged in the vicinity of the table 22 to provide information to the user, for example a surgeon. An interface unit 30 is arranged to provide the possibility to further control the system.

A subject, for example a patient, not further shown in FIG. 1, can be located between the source of X-ray radiation and the detector arrangement 20 during the radiation procedure. The detector is sending data to the processing unit 14 via the interface unit 16 to provide the detected raw image data to the processing unit. Of course, the processing unit 14 and the interface unit 16 can be located at other locations, e.g. at a different laboratory room or a control room.

Further, it is noted that the example shown is a so-called C-type X-ray image acquisition device. Of course, other X-ray image acquisition devices can be provided, for example CT systems and stationary systems with fixed or movable X-ray source and detector arrangements. Of course, also movable X-ray devices can be provided. For example, a mammography system can be provided according to the invention, e.g. systems where the patient stands during examination or systems in which a patient is laying on an examination table.

Figure 2:
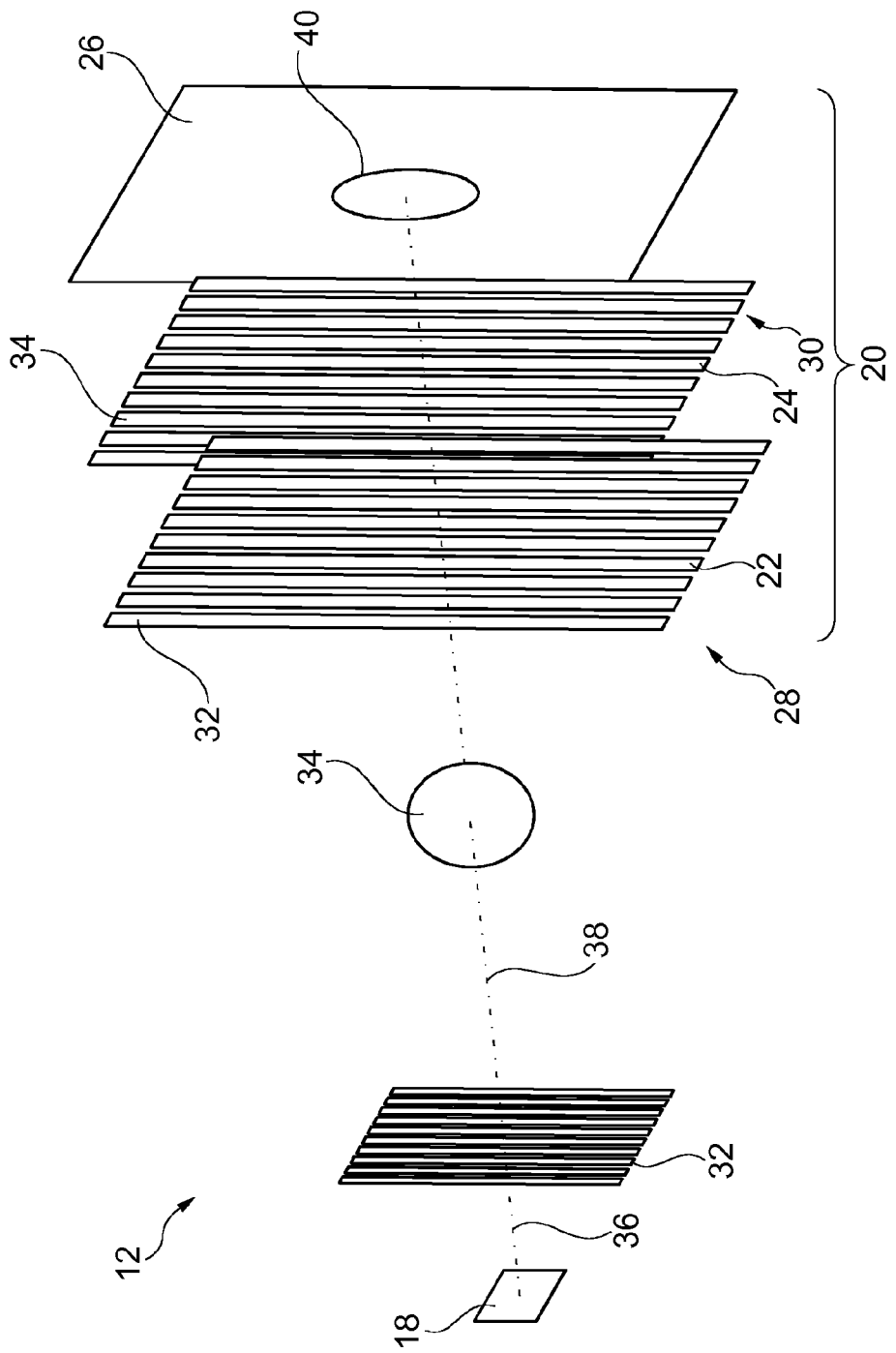
FIG. 2 illustrates an X-ray image acquisition device in a schematic setup with a detector arrangement, according to the invention.

With reference to FIG. 2, the above mentioned detector arrangement 20 shall be described in the following. The detector arrangement 20 comprises a phase grating 22 and an analyzer grating 24. Further, a detector 26 with a sensor adapted to record intensity variations of X-ray radiation is provided.

The phase grating 22 is provided as a deflection device 28 according to one of the embodiments described with reference to FIGS. 3 to 17. The analyzer grating 24 can be provided as an absorption device 30 according to one of the embodiments described with reference to FIGS. 18 and 19.

As already indicated above, the detector arrangement 20 is part of an X-ray image acquisition device 12. The X-ray image acquisition device 12 is shown with the X-ray source 18 and a source grating 32 together with a detector arrangement 20. Further, an object 34 is schematically indicated.

The X-ray source 18 generates an X-ray beam 36 of polychromatic spectrum of X-rays. In order to provide sufficient coherence to the X-ray beam applied to the object, the source grating 32 is adapted with a respective grating structure accordingly. As a consequence, interference can be observed at the location of the analyzer grating 24. Thus, the X-ray beam 36 passes the source grating 32 and is then provided as an adapted X-ray beam 38.

According to an example, the X-ray image acquisition device comprises the source grating 32 adapted to split the X-ray radiation of the X-ray source generating the at least partly coherent X-ray radiation; wherein the source grating is provided with a source grating pitch; and wherein the ratio of the source grating pitch to the analyzer grating pitch is equal to the ratio of the distance between the source grating and the phase grating to the distance between the phase grating and the analyzer grating.

According to a further exemplary embodiment, although not further shown, the source grating can be omitted and the X-ray source is adapted to provide sufficient coherent X-ray radiation, so that interference can be observed at the location of the analyzer grating, for example by synchrotron or microfocus X-ray tubes.

In FIG. 2, it is shown that the source 18, the source grating 32, the phase grating 22, and the analyzer grating 24 as well as the detector 26 are arranged along an optical path. The detector thus records image information of the object 34, which image information is schematically indicated with reference numeral 40.

According to an aspect of the invention, the analyzer grating and the phase grating are arranged such that the deflection structure 42 is aligned with the absorption structure 162.

Referring to the drawings in FIG. 3 et seq., the deflection device 28 according to the invention will be described in several exemplary embodiments.

The deflection device 28 for X-ray differential phase-contrast imaging comprises a deflection structure 42 with a first plurality 44 of first areas 46, and a second plurality 48 of second areas 50.

The first areas 46 are provided to change the phase and/or amplitude of an X-ray radiation schematically illustrated with a number of parallel arrows 52. The second areas 50 are X-ray transparent.

According to the present invention, in general, the term "X-ray transparent" may comprise an X-ray attenuation of less than 40%, preferably less than 20%. In particular, an attenuation of less than 10% is provided.

Further, in general, in order to provide the change of the phase and/or amplitude of an X-ray radiation, the first areas have an X-ray attenuation which is larger than the X-ray attenuation of the second areas.

Further, with reference to FIG. 3 et seq., the first and second areas 46, 50 are arranged periodically such that, in the cross section, the deflection structure is provided with a profile arranged such that the second areas 50 are provided in form of groove-like recesses 54 formed between first areas 46 provided as projections 56. Adjacent projections thus form respective side surfaces 58 partly enclosing the respective recess 54 arranged in between. Further, the side surfaces 58 of each recess 54 have a varying distance across the depth of the recess 54. The varying distance is also indicated with reference numeral 60 and the letter W, the depth of the recess is indicated with reference numeral 62 and the letter D.

According to an aspect of the invention, the deflection device is a phase deflection device, also referred to as a phase grating, despite having a deflection structure differing from a phase grating with parallel bars and slits. According to a further aspect of the invention, the deflection device is adapted for focussing, or collimating and concentrating, intensity of the X-ray radiation.

According to a further aspect of the invention, the deflecting effect of the deflection structure comprises refraction and diffraction. According to a further aspect, the recesses and the projections are provided in an alternating manner.

According to a further aspect, each projection has a varying width $W_P$ across the height of the projection 56. This is indicated in FIG. 3 with a first projection width $W_{P1}$ in the upper region of the projection 56 and the second projection width $W_{P2}$ in the lower section of the projection 56, wherein the terms upper and lower refer to the reading orientation of FIG. 3.

According to a further aspect, the recesses 54 each have a decreasing width along their depth. This is indicated in FIG. 3 with a first recess width $W_{R1}$ in the upper region of the recess 54, and a second recess width $W_{R2}$ in the lower section of the recess 54. In other words, the recesses are wider at their opening side than on their bottom side or closed side (see also FIG. 4 and others). It is noted that the terms opening side of the recess refer to the arrangement shown in FIG. 3 et seq., where the opening side refers to the so-to-speak entering of the beam radiation 52 into the recess 54.

The bottom side is arranged downstream the X-ray radiation direction, i.e. away from the X-ray source.

According to a further aspect, the projections each have an increasing width along their height in the radiation direction, i.e. from top to bottom, i.e. they are wider at their base and narrower at their opposite edge, which opposite edge is facing the X-ray source.

According to a further aspect of the invention, the first and second areas 56 and 50 are arranged side by side as shown in FIG. 3, in a perpendicular arrangement with respect to the X-ray radiation 52.

It is noted that the structure of the deflection device 28 is shown in a cross section in FIG. 3. This is also the case for FIGS. 4 to 17, and FIGS. 18 and 19 with respect to the absorption device 24.

According to a further aspect, shown in FIG. 4, the first areas 46 are connected by a common first area 64 such that a first continuous surface 66 is formed.

According to a further aspect, the first surface 66 is provided as a phase profile.

The periodical arrangement of the first and second areas is indicated with a periodicity p, indicated with reference numeral 68.

According to a further aspect, shown in FIG. 5, the recesses 54 have an increasing width in the direction of the X-ray radiation 52, i.e. the projections 56 are wider at their edge or end facing towards the X-ray radiation, and narrower at the other edge, for example where the recesses are connected to the common first area 64.

It is explicitly mentioned that the provision of first and second areas 46, 50 side by side as shown in FIG. 3, and the provision of first and second areas 46, 50, wherein the first areas 46 are connected to the common first area 64 as in FIG.

4, can both be combined with one or more of the following aspects described with reference to the following figures.

According to a further aspect, not shown, the recesses are arranged linearly in a plane perpendicular to an X-ray projection direction.

According to a further aspect, the recesses are arranged parallel to each other in a curved pattern (not shown).

The recesses may also be arranged as parallel waveforms.

According to a further exemplary embodiment, every period P of the deflection structure is adapted to function as a micro-lens structure 70 focussing X-ray radiation such that at a distance from the micro-lens structure 70 intensity maxima are obtained.

This will be further explained, for example, with reference to FIG. 21 et seq. An example for a micro-lens structure 70 is shown in FIG. 6. However, it is noted that also the structures shown in FIGS. 3 to 5 may also be adapted to function as a micro-lens structure.

According to a further aspect, the intensity maxima are finer than the first areas, which will be explained further below.

According to a further aspect, the deflection structure 42 is provided to function as an array of micro-lenses.

For example, the deflection structure is provided as a diffractive structure focussing X-ray radiation.

According to the example shown in FIG. 6, the profile of the deflection structure 42 is provided as a parabolic phase profile 72.

According to the exemplary embodiment shown in FIG. 7, the profile of the deflection structure 42 is provided as a sinusoidal profile 74.

The profile of the deflection structure 42 may also be provided as a spherical profile 76 as shown in FIG. 8, and a further spherical profile 78 as shown in FIG. 9.

The examples shown in FIGS. 8 and 9 indicate an array of spherical elements arranged next to each other in an adjacent manner. In FIG. 8, the spherical, i.e. half-circle cross sections, are so-to-speak attached to a common ground plate, thus forming V-shaped second areas 80 between half-dome-shaped first areas 82.

The profile shape of FIG. 9 comprises a sort of opposite structure, namely rounded U-shaped second areas 84 between sharp-edged formed first areas 86. The profile shown in FIG. 9 can be provided, for example, by forming half-dome recesses into a ground plate, which leaves a common connection section 88 for connecting the first areas 86.

However, of course different variations from the above described curves or profiles are possible and are not further described.

Further, combinations of different shaped sections are also possible.

According to a further aspect, the micro-lens structures are provided with a parabolic, sinusoidal and/or spherical phase profile.

According to a further aspect, the profile of the deflection structure 42 is provided with a discretized shape 90, for which an example is shown in FIG. 10.

As can be seen, the discretized shape may be provided as a stepped profile with stepping sections.

For example, each period is provided with at least two steps.

Each period may be provided with eight steps, sixteen steps, or another integer plurality of steps.

According to a further aspect of the invention, the first areas 46 are provided with a plurality 92 of projection shapes, wherein the different projection shapes are arranged in a repetitive order. For example, as shown in FIG. 11, a first projection shape 94 and a second projection shape 96 are provided, which projection shapes are arranged periodically with a periodicity $P_2$ of the phase grating, indicated with reference numeral 98.

According to a further aspect, the profile of the deflection structure 42 is provided as a plurality of curved profile segments 100, wherein the segments 100 are generated by wrapping back curve segments by pi ($\pi$) or an integer multiple of pi, for example 2pi or 4pi. This shall be explained with reference to FIGS. 12 to 14.

Figure 12:
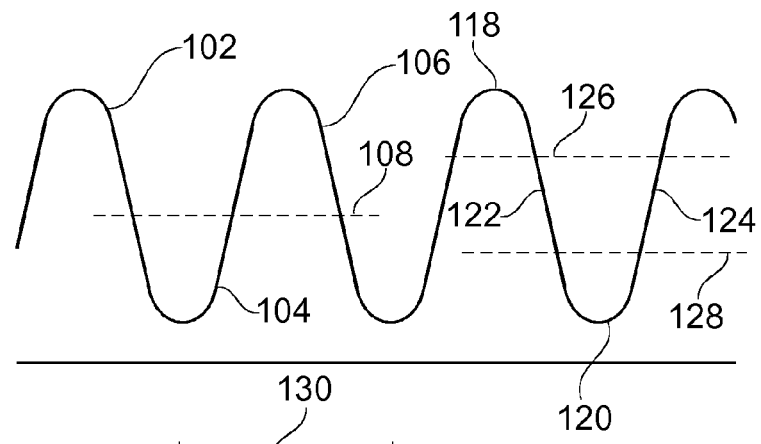
FIGS. 12 to 14 show further exemplary embodiments of a deflection device according to the invention.

FIG. 12 shows a sinusoidal shaped phase profile 102. The phase profile 102 can be subdivided into a first profile segment 104 and a second profile segment 106, which are divided from each other by a first separation line 108.

Figure 13:
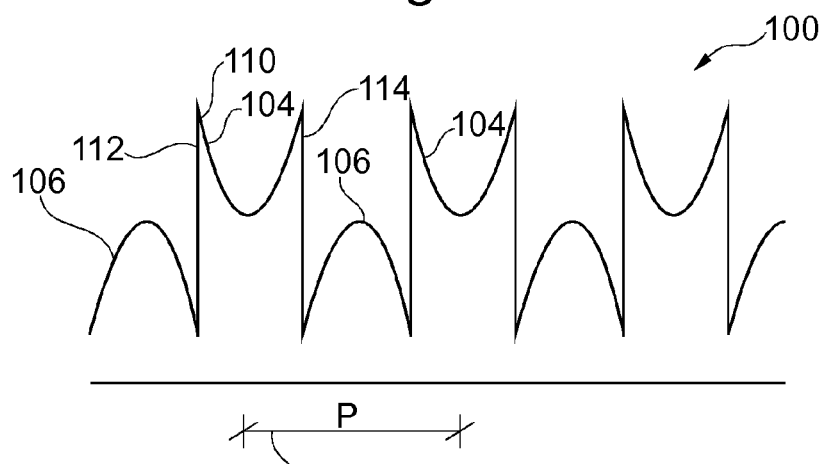

FIG. 13 shows a first example for a profile 110 with curved profile segments. The curve 110 comprises the second segments 106 in an alternating manner with the first segments 104. As can be seen, when viewing the curve starting from the left, the curve starts with a second segment 106 and is then followed by a first transition part 112 which indicates the wrapping back (or folding back) of the curve segments, i.e. the first curve segments 104, by pi or an integer multiple of pi. The curve then shows a first segment 104 and a second transition part 114, followed by a further second segment 106, and so forth.

The wrapping back provides the advantage that larger peak-to-peak distances of the curve can be provided with a thinner structure in the cross section.

For example, the profile of the deflection structure 42 is provided as a plurality of parabolic, sinusoidal and/or spherical profile segments.

Figure 14:
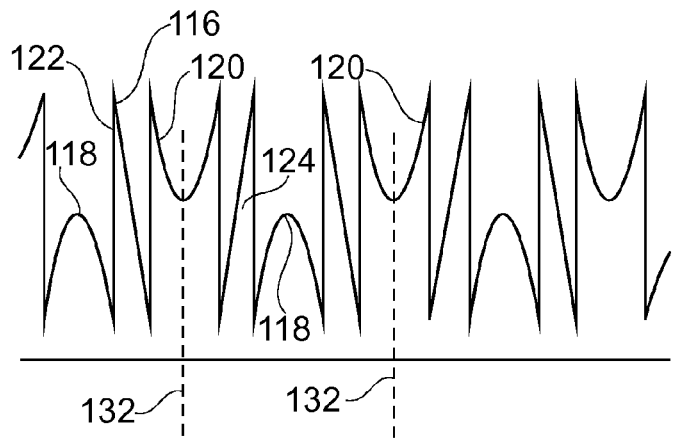

For example, the profile of the deflection structure 42 comprises convex and concave shaped surface parts between the first and second areas, as shown in FIGS. 13 and 14.

In FIG. 14, the deflection structure 42 is provided with a third profile 116, comprising first curve segments 118, second curve segments 120, a first intermediate curve segment 122 between the first segment 118 and the second segment 120. Between the second segment 120 and the following first segment 118, a second intermediate segment 124 is provided. The forms of the first, the second, and the two intermediate segments results from dividing a sinusoidal profile into three segments, as indicate with a pair of second dividing lines 126, 128 in FIG. 12. The sinusoidal profile, shown as an example, is divided into the first segment 118, the second segment 120, and the first intermediate segment 122, as well as the second intermediate segment 124.

As indicated with reference numeral 130, the curve shown in FIG. 12 as well as the curve shown in FIG. 13 shows a periodicity p.

It is noted that the curve in FIG. 13 is an alternating repetition of the first and second segments 104, 106. It is further noted that the projection shapes of FIG. 14 are arranged in an order which is repeated around a plurality of mirror axes, which mirror axes are arranged periodically in the optical axis of the lens structure. For example, the recess formed by the second segments 120 has in its centre, as a result, a first optical axis which is repeated whenever a second segment 120 is provided. As can be seen, the optical axes are indicated with a dotted line 132. As can be seen further, the arrangement or pattern of the different curve segments of the profile in FIG. 14 shows a repetition order based on mirroring around the optical axis 132.

According to an example not further shown, for microfocus tubes, real 2D lens arrays are provided or cylinder lenses.

According to a further example, not further shown, the profile of the deflection structure is continued in a direction transverse to the cross section in an unchanged manner.

For example, the deflection structure comprises cylindrical lenses.

According to an alternative example (not further shown), the profile of the deflection structure is continued in a direction transverse to the cross section in a periodically modified manner, for example with a similar modification as over the cross section.

For example, the deflection structure has a two-dimensionally lensing or focussing effect.

Figure 15:
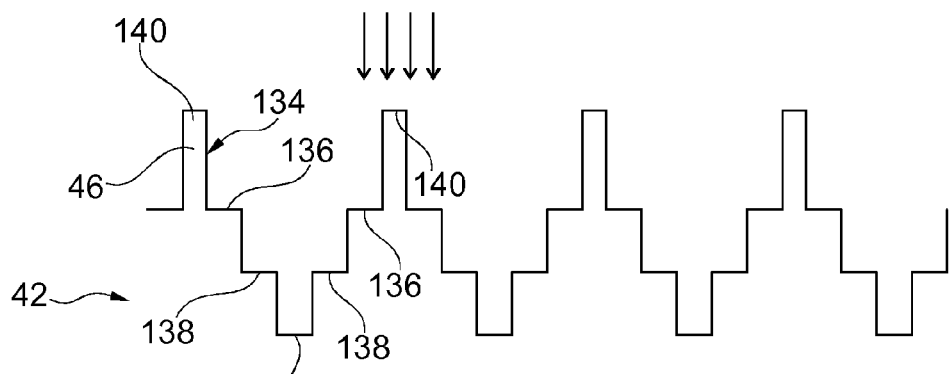
FIGS. 15 to 17 show further exemplary embodiments of a deflection device according to the invention.
Figure 16:
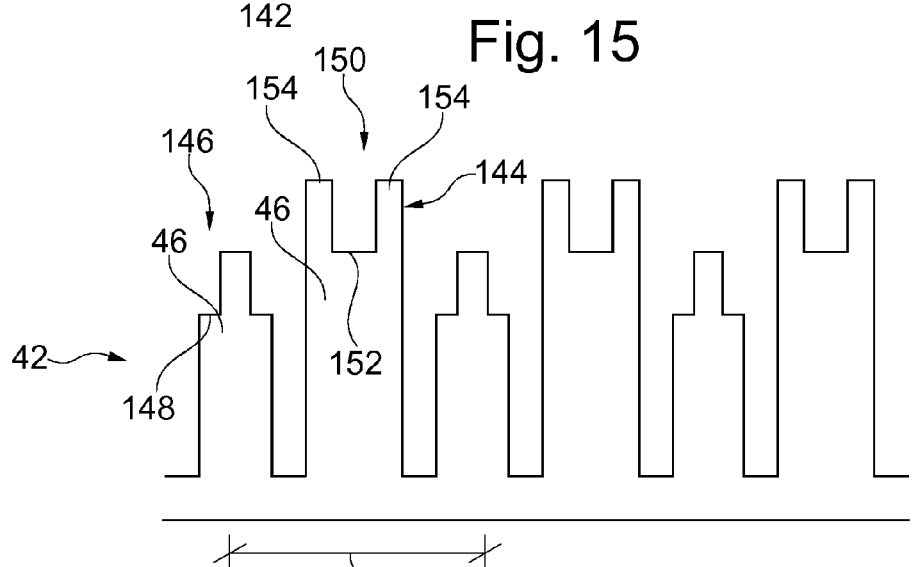
Figure 17:
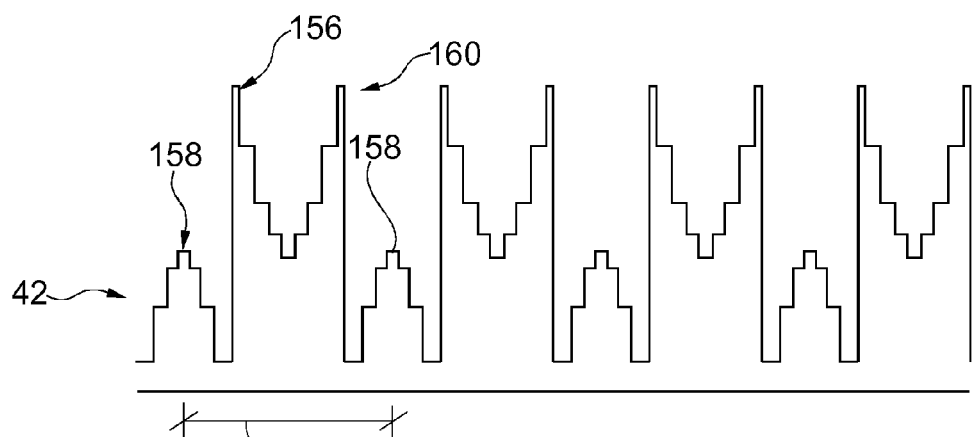

FIGS. 15 to 17 show further examples of stepped curve phase profiles of the deflection structure 42.

For example, the curve 102 of FIG. 12 can be provided as a stepped profile 134, shown in FIG. 15. The first areas 46 are arranged with a stepped profile with a first step 136 and a second step 138 arranged between the upper part and the lower part, i.e. arranged between a peak segment 140 arranged towards the X-ray source and, in the X-ray radiation downstream, a bottom segment 142.

Thus, for example, the sinusoidal profile 102 of FIG. 12 is so to speak replaced with the discretized shape of FIG. 15.

FIG. 16 shows a further stepped phase curve 144, in which the first areas 46 are provided with two different projection shapes. When reading FIG. 16 from the left, a first projection shape 146 is provided with a first step 148 between the lowest part and the upper part. The first projection shape so-to-speak replaces the second segment 106 of FIG. 13.

The first projection shape 146 is followed by a second projection shape 150 which comprises a lower part 152 arranged between two upper parts 154, thus, so-to-speak, replacing or representing a discretized or stepped version of the first segment 104 of FIG. 13.

The profile 144 then shows a further repetition of the first profile part 146 followed by a further second profile part 150.

With respect to one period, indicated with reference numeral 130, the profile shows eight different sections with variations of material thickness. For example, the material may have four different thicknesses.

FIG. 17 shows a further stepped or discretized shape profile 156, representing a finer stepped version of the curve shown in FIG. 14. A first projection shape 158 is followed by a second projection shape 160, followed by a first projection shape 158, and so forth.

As indicated in FIG. 17, the projection shapes 158, 160 have two steps between the lowest and the upper part (first projection shape 158) or three steps between the upper and lower parts (second projection shape 160). Thus, with respect to one period of the structure, indicated with the reference numeral 130, sixteen different sections with eight levels of material thickness are provided, resulting in a finer deflection structure profile.

Figure 18:
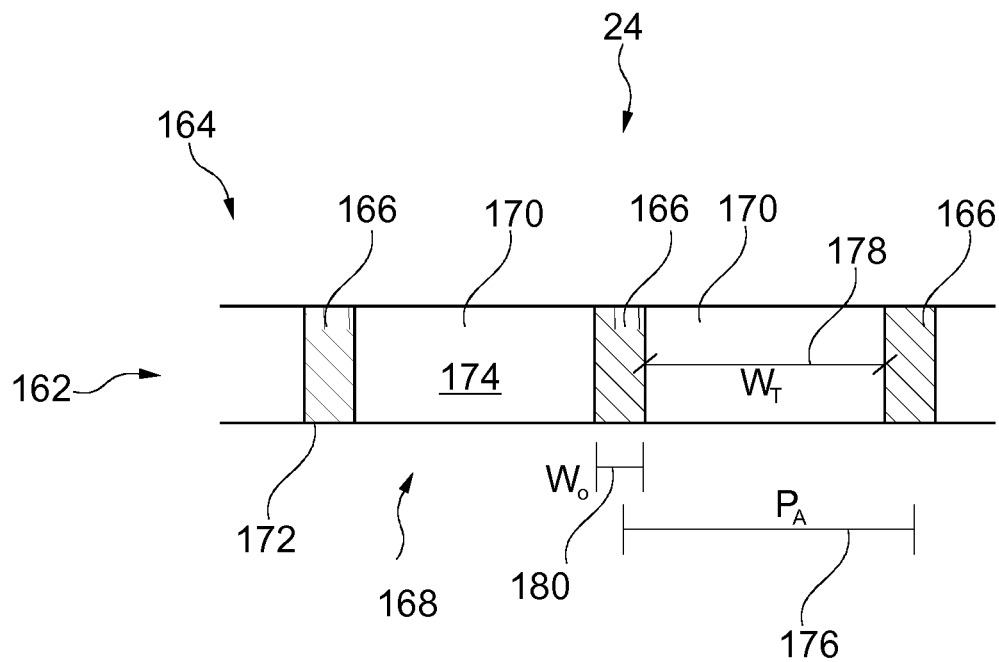
FIG. 18 shows an exemplary embodiment of an absorption device according to the invention.

According to a further exemplary embodiment, an absorption device 24 for X-ray differential phase-contrast imaging, as shown in FIG. 18, comprises an absorption structure 162 with a third plurality 164 of third areas 166 and a fourth plurality 168 of fourth areas 170. The third areas 166 are X-ray opaque, and the fourth areas 170 are X-ray transparent.

For the term "X-ray transparent", see above. The term "X-ray opaque" may comprise an X-ray attenuation of more than 70%, preferably more than 90%.

According to a further aspect, the third and fourth areas 166, 170 are arranged periodically such that, in the cross section, the absorption structure 162 is provided with an absorption profile in which the third areas 166 are provided as absorption projections 172, partly enclosing X-ray transparent fillings 174 as the fourth areas 170 in between.

The periodic arrangement is indicated with letter $p_A$, indicated with reference numeral 176.

The transparent fillings 170 each have a wider cross section than the absorption projections, wherein the cross section of the transparent fillings 170 is indicated with letter $W_T$ and reference numeral 178, and the cross section of the absorption projections 172 is indicated with letter $W_O$ and reference numeral 180.

The fourth areas 170 thus each have a wider cross section than the third areas 166.

For example, the absorption device 24 is referred to as an analyzer grating.

According to a further aspect of the invention, the absorption structure may be a grating structure with bars and gaps arranged in an alternating manner, wherein the bars are provided as the third areas and wherein the gaps are provided as the fourth areas.

According to a further aspect of the invention, over one pitch, the ratio of the absorption area to the X-ray transparent area is smaller than 1:1, preferably smaller than 1:4, for example 1:8. Of course, other integer or also fractions of the ratio range smaller than 1:1 are also possible.

The ratio of the X-ray radiation hitting the analyzer grating to the amount of X-ray radiation passing the analyzer grating and thus being able to hit the detector is an important parameter. The inverse quantity, i.e. the amount being absorbed is also called duty cycle of the analyzer grating. The duty of the analyzer grating is in any case less than 50%, preferably less than 30% or, for example, less than 20%.

With reference to FIG. 18, the absorption device 24 is shown as an arrangement of alternating third and fourth areas 166, 170. The third areas 166 can be provided as bars and the fourth areas 170 may be provided as open gaps in between.

According to a further aspect, the fourth areas 170 may also be provided as filling arrangements, i.e. with a filling structure.

Figure 19:
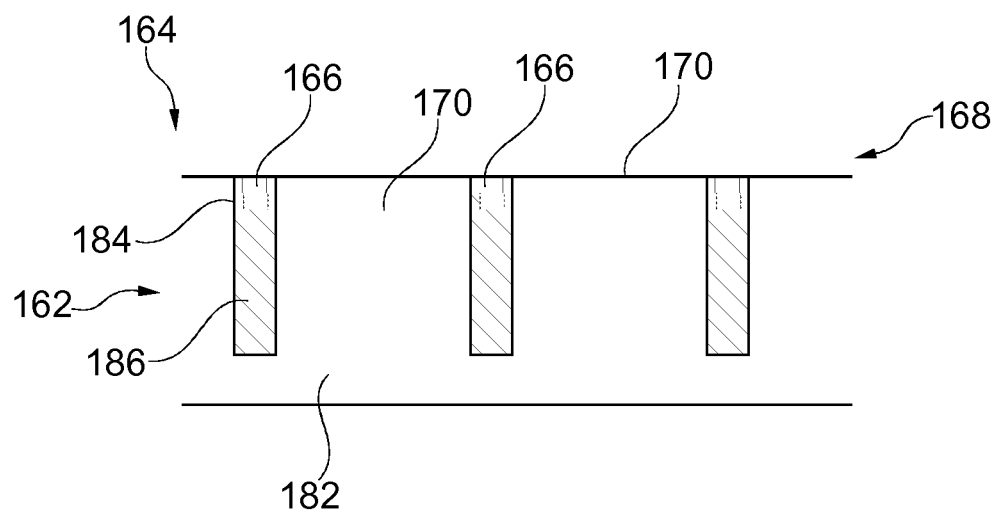
FIG. 19 shows a further exemplary embodiment of an absorption device according to the invention.

According to a further example shown in FIG. 19, the absorption structure is provided with a body structure 182 in which slot-like recesses 184 are formed, which recesses are filled with an absorbing filling material 186, such that the filled recesses form the third areas 166 arranged as the third plurality 164. The areas of the body structure 182 between two adjacent recesses are representing the fourth areas, arranged as the fourth plurality 168.

The recesses 184 are shown to be filled with the filling material 186 completely. Of course, they may also be only partly filled.

It is further noted that the depth of the recesses shown is only indicating a schematic arrangement. Of course, the recesses can also be arranged with a smaller depth and also with different ratio relating to depth and width.

According to a further exemplary embodiment, the third areas 166 are provided on a base structure, such that the base structure is provided as an X-ray transparent material and the third areas are provided as X-ray opaque material. In other words, in this example, the third areas are provided or attached to a supporting base, wherein the parts between adjacent or neighbouring third areas are representing the fourth areas through which X-rays can pass without any essential absorption. In the areas of the third areas, the X-ray radiation is absorbed.

Figure 20:
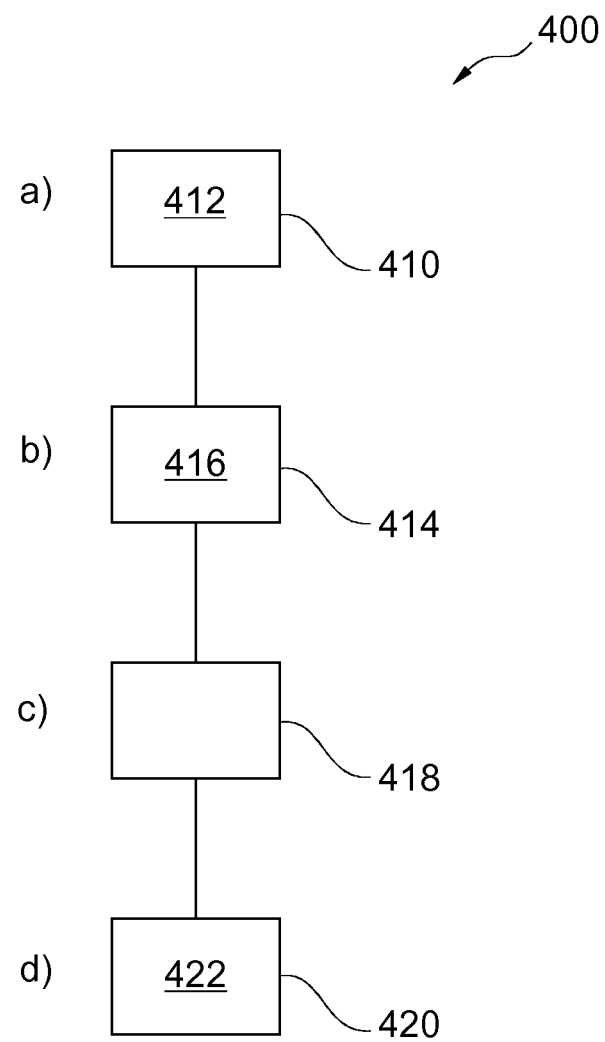
FIG. 20 shows basic steps of an embodiment of a method according to the invention.

FIG. 20 shows basic method steps of the method 400 for differential phase-contrast imaging comprising the following steps: In a first application step 410, at least partly coherent X-ray radiation 412 is applied to an object of interest. In a second application step 414, the X-ray radiation passing the object is applied to a phase grating which phase grating recombines 416 the splitted beams in an analyzer plane. In a third application step 418, the recombined beams are applied to an analyzer grating arranged in the analyzer plane. Further, in a recording step 420, raw image data is recorded with a sensor while transversely stepping 422 the analyzer grating or phase grating with multiple steps with a step size of at most p/(n*k), wherein p is the pitch of the analyzer or phase grating, wherein k is larger than 1, for example k=2 or k=3.

For example, according to the invention, the starting point is the width of the maxima generated by the deflection grating at the location of the analyzer grating. This quantity is determined mainly by the "focusing power" of the lens array. Once the fraction of the width of the intensity maxima to the distance between adjacent maxima is known, the design of the analyzer grating can be derived. The analyzer must have the same periodicity as the interference pattern and the duty cycle of the analyzer must be about the duty cycle of the interference maxima. The analyzer should then sample each intensity maximum at least 4 times. This means that if 1/n is the duty cycle of the intensity maxima, the minimal number of steps required should be n*k, wherein k is larger than 1, e.g. preferably k=2 or k=3.

According to the invention, the phase grating in the second application step 414 is a deflection device 22 according to one of the above described exemplary embodiments or aspects. The analyzer grating in the recording step 420 is an absorption device 24 according to one of the above described exemplary embodiments or aspects. Further, 1/n is the ratio of the absorption area to the pitch of the analyzer grating.

The first application step 410 is also referred to as step a), the second application step 414 as step b), the third application step 418 as step c), and the recording step 420 as step d).

According to a further exemplary embodiment, not shown, in step d), the stepping is provided in a partly overlapping manner, i.e. each following step partly overlaps the position of the preceding step.

The overlapping may be provided with at least 30%, preferably more than 50%. Of course, with an increasing overlap, the number of steps in the recording step 420 for the stepping 422 increases.

According to a further exemplary embodiment, not shown, step a) comprises applying X-ray radiation of a conventional X-ray source to a source grating splitting the radiation, wherein coherent X-ray radiation is generated, or at least partly coherent X-ray radiation.

For example, the coherent radiation upon passage through the deflection grating generates an x-ray interference pattern comprising interference maxima with a given width. The exact dislocation of the intensity maxima due to phase changes imprinted by the object can be measured using a phase-stepping technique. During the phase-stepping either the deflection grating or the analyzer grating are stepped in a transverse direction relative to each other while the X-ray intensity on all detector pixel is recorded. The number of required steps is determined by the focussing quality of the micro-lensing plate of the deflection device. The finer the maxima, the smaller the corresponding X-ray opaque structures on the analyzer grating and the better the dose utility.

For example, there is a geometric matching between the structures of the two gratings, the duty cycles and the geometry of the whole setup.

According to an aspect of the invention, the distance of the deflection grating to the analyzer grating is determined by the focal distance of the deflection structure, e.g. the lens structure.

According to an aspect of the invention, the pitch of a source grating obeys the following geometrical relationship: The ratio of the pitch of the source grating ($P_{SG}$) to the pitch of the analyzer grating ($P_{AG}$) is equal to the ratio of the distance between the source grating and the phase grating ($D_{SG-PG}$) to the focal length ($f_1$) of the deflection structure; wherein the focal length is equal to the distance between deflection grating and the analyzer grating. In other words:

$$P_{SG}/P_{AG}=D_{SG-PG}/f_1$$

According to a further aspect of the invention, the Talbot distance is replaced by the focal length of the deflection structure, e.g. focal length of a lens structure.

However, also the number of required phase steps increases with finer intensity maxima, as each maximum should be sampled, for example, at least 4 times during the stepping. For a full width half maximum of the order of p/n with n an integer number, the step size should thus be at most p/(n*k), wherein k is larger than 1, e.g. k=2 or k=3.

In the following, further aspects will be described with reference to FIGS. 21 to 26. It is explicitly noted that the structural principles and functional effects and thus achievable results described in the following are also applicable to one of the above described exemplary embodiments or aspects and examples.

As a general aspect of the invention, by providing the deflection device as a phase grating which provides a focussing or a bundling of X-ray radiation such that at a distance from the deflection device, intensity maxima are obtained, it is possible to provide an absorption device which has a duty cycle of less than 50%. As a consequence, a detection fraction of the total X-ray flux transmitted by the object of more than 50% is achieved, while comparable or improved information is provided, as would be the case of the 50% cycle absorption with the grating approach in which the phase grating is provided with parallel bars and gaps. Following, the present invention utilizes a much larger fraction of the flux transmitted by the object under study than commonly feasible. The lower limit for the duty cycle of the absorption device, or absorption grating, is determined only by the efficiency of the focussing of diffracted arrays, for example of micro-lenses, which again is mainly dependent on the accuracy of the fabrication of such structures.

In differential phase-contrast systems in the hard X-ray regime (10 to 100 keV), the Talbot effect is used in order to visualize phase changes imprinted by an object onto the X-ray wave front. In order to benefit from short system geometries, a phase grating with a bars and gaps structure has a rectangular phase profile so that the rectangular intensity profile is reproduced for the first time at 1/16 of the Talbot distance 2(pitch of phase grating)^2/lambda. The rectangular phase grating has to have fringes as wide as the walls (the phase grating has to have a duty cycle of ½) to maintain a rectangular profile at the position of the absorption grating G2. Thus, the duty cycle of G2 has to be ½ as well to obtain a maximum of visibility during the stepping of the fringes. Typically, the pitch $P_1$ of the phase grating G1 is of the order of micrometers, about four orders of magnitude larger than the X-ray wave length. Thus, the diffraction effects take place mainly at the walls of the fringes.

In contrary to this, the present invention provides, for example, sinusoidal or parabolic phase objects that can be used with the effect that the diffraction effect will occur over the entire cross section of the beam. The important consequence of this is that every period of the phase grating or deflection device, will function as a small cylindrical microlens in the simplest case and focus the radiation impinging within a band of width $P_1$ into a certain focal point, some distance f downstream the object. Through the effect of the focussing, the duty cycle of the absorption grating, i.e. the absorption device, can be reduced significantly, so that the full width at half maximum (FWHM) of the intensity at the focus coincides roughly with the width of, for example, the gold trenches in the silicon, as described in FIGS. 18 and 19.

In FIGS. 21 to 23, different tables are shown in which the horizontal axis, indicated with reference numeral 212, describes the transverse dimension, for example in micrometer.

In FIG. 21, three different deflection structures are assumed, which is indicated with reference numerals a), b), and c) above the respective columns, also indicating that FIG. 22 and FIG. 23 also refer to the respective deflection device structure. In other words, FIGS. 21 to 23 can be read as a spreadsheet comprising three rows, namely FIG. 21, FIG. 22, and FIG. 23 and three columns, namely column a), column b), and column c).

The drawings in the first row, i.e. FIG. 21, indicate an X-ray phase 214 on the vertical axis. FIG. 22 indicates a propagation distance, for example in millimetre, starting from the upper part, indicated with 0. Further, FIG. 23 shows X-ray intensity 218 on its vertical axis.

In FIG. 21a), a first wave phase profile 220 is shown, which is similar to the one shown in FIG. 12 from a geometrical point of view. FIG. 21b) shows a further wave phase profile 222, see also FIG. 13. Further, FIG. 21c) shows a still further wave phase profile 224.

The wave phase profiles 220, 222, and 224 are shown as sinusoidal phase objects with different peak-to-peak phase shifts of pi (profile 220), 2 pi (profile 222), and 4 pi (profile 224).

FIG. 22a) shows a first propagated wave intensity 226, FIG. 22b) shows a second propagated wave intensity 228, and FIG. 22c) shows a third propagated wave intensity 230. In each of the propagated wave intensity illustrations, a scale 232 arranged on the right side of the respective propagated wave intensity indicates the intensity value for the respective grade scale.

By comparing the respective propagated wave intensities 226, 228, and 230, the effects of the reduction of focal length with increasing amplitude can be seen.

According to a further aspect, the deflection structure is adapted to provide a propagated wave intensity profile at the respective focal distances, which wave intensity profile shows a major part of the curve around a base level as base parts 240 and periodic peaks protruding from the base level as peak parts 242; and wherein the geometric length relation of the peak parts to the base parts across one period is smaller than 1.

For example, FIG. 23 illustrates a first propagated wave intensity profile 234 in FIG. 23a), a second propagated wave intensity profile 236 in FIG. 23b), and a third propagated wave intensity profile 238 in FIG. 23c). As can be seen, the propagated wave intensity profiles 234, 236, 238 show a major part of the curve around the base level as base parts 240 and periodic peaks protruding from the base level as peak parts 242. The geometric length relation of the peak parts and the base parts across one period, indicated with reference numeral 244 and reference letter P, is smaller than 1:1, i.e. smaller than 1. For example, the relation of the peak parts to the base parts is at most 1:2, preferably 1:4 or less, such as 1:8, for example.

It must be noted that the propagated wave intensity profiles in FIGS. 23 and 26 correspond to fractions of less than $\frac{1}{16}$, $\frac{1}{32}$, and $\frac{1}{64}$ of the Talbot distance.

As an aspect of the invention, the deflection structure 42 according to the invention is adapted to provide a propagated wave phase profile, for example with a sinusoidal shape.

According to a further aspect of the invention, an intensity profile, for example the one shown in FIG. 23, is reproduced for the first time at a distance of less than $\frac{1}{16}$ of the Talbot distance. The intensity profile is reproduced, for example, at $\frac{1}{20}$ of the Talbot distance or less.

According to a further aspect of the invention, the Talbot-Lau-interferometry is not strictly applicable.

For example, in order to achieve an alignment of the interferences of the single line sources, for example of a source grating, $p_0=p_2 \times 1/f$ has to be fulfilled, wherein f is the focal distance or focal length of the lens structure, or lens array.

According to a further aspect, the first areas are provided with such a shape that a transmitted wave phase profile with peak-to-peak amplitudes of pi or an integer multiple of pi ($\pi$), for example 2pi or 4pi, are implemented. The transmitted wave phase profile may have an amplitude of a sinusoidal phase modulation. For example, the higher this amplitude the steeper the imprinted phase profile, the better the so-to-speak lensing effect.

With reference to FIGS. 22 to 23, as can be seen, the higher the amplitude of the modulations of the phase plate G1, i.e. the deflection device 28, the smaller the focal length of the plate as the curvature of the corresponding phase objects increases.

As can be seen from FIG. 23, the propagated wave intensity profile has a smaller value, i.e. fewer, areas with a maximum compared to the areas with lower values of the X-ray intensity 218. Thus, an absorption structure to be provided as an absorption grating, i.e. an analyzer grating, has to show less area covered with absorbing material, thus letting a higher percentage of the X-ray radiation impinging on the respective structure through in order to be recorded by the detector. As a consequence, a higher amount of X-ray radiation which has already passed an object can be used for recording and generating image information. For example, such an improved use of the X-ray radiation is especially important when examining patients in medical X-ray imaging.

In FIGS. 24 to 26, two further deflection structures are shown with their propagated wave phase profile in FIG. 24, the propagated wave intensity in FIG. 25, and the propagated wave intensity profile in FIG. 26. Again, the figures are arranged in a spreadsheet-like manner, showing three rows in two columns. The rows are indicated with FIG. 24 for the first row, FIG. 25 for the second row, and FIG. 26 for the third row. The columns are indicated with letter d) for the first column, and letter e) for the second column, in addition to FIGS. 21 to 23 with columns a) to c).

In FIG. 24, a fourth wave phase profile 246 is shown, and a fifth wave phase profile 248 is shown in FIG. 24e). The wave phase profile 246 shows similarity to the structure shown in FIG. 16, and the wave phase profile 248 shows similarity to the structure shown in FIG. 17, and are thus not further described.

In FIG. 25d), a fourth propagated wave intensity profile 250 is shown, and a fifth propagated wave intensity 252 is shown in FIG. 25e).

Accordingly, FIG. 26d) shows a fourth propagated wave intensity profile 254, and FIG. 26e) shows a fifth propagated wave intensity profile 256. The propagated wave intensity profiles 254, 256 also show base parts 240 and peak parts 242.

Although the propagated wave phase profiles 246, 248 are shown in a discretized profile manner, also the resulting propagated wave intensity profile in the focus distance is showing small parts with peaks and larger parts with low values. Thus, an absorption structure can be provided in order to record the respective propagated wave intensity profiles during phase stepping, which absorption structures need only to have a lower fraction to be X-ray absorbing, whereas a larger part of the structure can be X-ray transparent. Thus, in accordance with the studies of FIGS. 21 to 23, also the discretized or stepped profiles lead to a similar result.

Since in micro-fabrication of sinusoidal profiles or parabolic profiles, the energies considered, for example, for medical imaging represent the challenging factor, the provision of discretized deflection structures, whit discretized shape in height, mean on the one hand a not so perfect focussing, but on the other hand an easier fabrication process. Therefore, the examples shown in FIGS. 24 to 26 with a discretized micro-lensing array for various degrees of discretization, show still improved result compared to a 50% duty cycle analyzer grating.

The term "degree of discretizations" refers to the number of different material depths that can be realized per pitch or period of the phase object.

For example, column d) of FIGS. 24 to 26 shows eight different sections with four possible levels of material thickness, whereas column e) shows 16 different sections with eight possible levels of material thicknesses.

The illustrations show a peak-to-peak of 2pi discretized form of a sinusoidal phase modulation. The intensity profiles in FIG. 26 show the intensity at fractions of less than $\frac{1}{16}$ and $\frac{1}{32}$ of the Talbot distance.

Generally, from the fine width of the intensity maxima shown in FIGS. 23 and 26, it can be seen that the duty cycle of the absorption structure, or analyzer grating, can be significantly reduced, thus leading to a much improved dose utility compared to a conventional geometry, where about 50% of the radiation transmitted by the object does not contribute to the signal.

The present invention can be used, for example, for differential phase-contrast imaging in general, be it computed tomography, radiography or mammography. The fact that according to the invention, phase-contrast imaging is feasible with improved dose efficiency without compromising the phase sensitivity, the present invention is especially applicable for medical applications using the technique.

In another exemplary embodiment of the present invention (not shown), a computer program or a computer program element is provided i.e. characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfil the procedure of an exemplary embodiment of the method as described above.

According to a further exemplary embodiment of the present invention (not shown), a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage.

The invention claimed is:

1. A deflection device for X-ray differential phase-contrast imaging, comprising:
   a deflection structure comprising a parabolic phase profile,
   the deflection structure comprising:
   a first plurality of first areas adapted to change a phase, or an amplitude, or both, of X-ray radiation; and
   a second plurality of second areas that are transparent to the X-ray radiation, the first and second areas being arranged periodically such that, in the cross section, the deflection structure is provided with a profile arranged such that projections exist in the first areas, and recesses exist in the second areas, adjacent projections forming respective side surfaces partly enclosing the respective recess arranged therebetween, wherein the side surfaces of each respective recess has a varying distance across the depth of the recess, and wherein each projection comprises at least two steps between a lower part of the projection and an upper part of the projection.

2. The deflection device according to claim 1, wherein an intensity profile is reproduced at a distance of less than 1/16 of a Talbot distance.

3. The deflection device according to claim 1, wherein the profile of the deflection structure is provided with a discretized shape.

4. The deflection device according to claim 1, wherein the first areas are provided with a plurality of projection shapes; wherein the different projection shapes are arranged in a repetitive order.

5. The deflection device according to claim 1, wherein the profile of the deflection structure is provided as a plurality of curved profile segments, and the segments are generated by wrapping back curve segments by $\pi$ or an integer multiple of $\pi$.

6. A detector arrangement of an X-ray system, the detector arrangement configured to generate phase-contrast images of an object, the detector arrangement comprising:
a phase grating;
an analyzer grating; and
a detector comprising a sensor adapted to record intensity variations of X-ray radiation, wherein the phase grating is provided as the deflection device according to claim 1.

7. An X-ray image acquisition device configured to generate phase-contrast images of an object, the X-ray acquisition device comprising:
an X-ray source configured to generate X-ray radiation;
a phase grating;
an analyzer grating; and
a detector, wherein the X-ray image acquisition device is adapted to provide an X-ray beam with sufficient coherence that interference exists at a location of the analyzer grating, the phase grating, the analyzer grating and the detector being provided as the detector arrangement according to claim 6.

8. The X-ray image acquisition device according to claim 7, comprising:
a source grating comprising a source grating pitch, and adapted to split the X-ray radiation of the X-ray source generating the at least partly coherent X-ray radiation, and
wherein a ratio of the source grating pitch to an analyzer grating pitch is equal to a ratio of a distance between the source grating and the phase grating to a distance between the phase grating and the analyzer grating.

9. An X-ray imaging system for differential phase contrast imaging, comprising:
the X-ray image acquisition device according to claim 7, and configured to generate phase-contrast images;
a processor adapted to control the X-ray source and phase-stepping of the analyzer grating and/or the phase grating; and
an interface adapted to provide detected raw image data to the processor.

10. A method for differential phase contrast imaging, the method comprising:
applying at least partly coherent X-ray radiation to an object of interest;
applying the X-ray radiation passing the object to a phase grating recombining the splitted beams in an analyzer plane;
applying the recombined beams to an analyzer grating arranged in the analyzer plane;
recording raw image data with a sensor while transversely stepping an analyzer grating or a phase grating with multiple steps with a step size of at most p/(n*k); and
wherein p is a pitch of the analyzer grating or the phase grating, n is a reciprocal of a duty cycle of the analyzer grating, and k is larger than 1, and the phase grating in is the deflection device according to claim 1.

11. A non-transitory computer readable medium comprising instructions stored thereon, executable on a processor, to cause the processor to control the deflection device according to claim 1.

12. The deflection device according to claim 1, wherein the parabolic phase profile does not comprise sharp-edges, or stepped portions, in the first plurality of first areas between the second plurality of second areas.

13. An absorption device for X-ray differential phase-contrast imaging, comprising:
an absorption structure, comprising:
a first plurality of first absorption areas that are opaque to X-rays; and
a second plurality of second absorption areas that are transparent to X-rays, the first absorption areas and second absorption areas being arranged periodically such that, in the cross section, the absorption structure is provided with an absorption profile such the first absorption areas comprise absorption projections that partly enclosing the second absorption areas therebetween, said second absorption areas comprising X-ray transparent fillings, wherein the transparent fillings each comprises a wider cross section than a width of the absorption projections.

14. The absorption device according to claim 13, wherein the absorption device is an analyzer grating.

15. The absorption device according to claim 13, wherein, over one pitch, a ratio of the cross-sectional area of first absorption areas to the cross sectional area of the second absorption areas is less than 1:1.

16. The absorption device according to claim 15, wherein, over one pitch, the ratio of the cross-sectional area of the first absorption areas to the cross sectional area of the second absorption areas is 1:8.

17. The absorption device according to claim 14, wherein a duty cycle of the analyzer grating is less than 50%.

18. The absorption device according to claim 17, wherein the duty cycle of the analyzer grating is less than 20%.

19. A deflection device for X-ray differential phase-contrast imaging, comprising:
a deflection structure, comprising a plurality of periods, the deflection structure comprising:
a first plurality of first areas adapted to change a phase, or an amplitude, or both, of X-ray radiation; and
a second plurality of second areas that are transparent to the X ray radiation the first and second areas being arranged periodically such that, in the cross section, the deflection structure is provided with a profile arranged such that projections exist in the first areas, and recesses exist in the second areas, adjacent projections forming respective side surfaces partly enclosing the respective recess arranged therebetween, wherein the side surfaces of each respective recess has a varying distance across the depth of the recess, and wherein at least one period of the periodically arranged first and second area is configured to allow the deflection structure to function, at least as per a shape of the deflection structure, as a micro-lense structure for focusing the X-ray radiation such that, at a distance from the micro-lens structure, at least one intensity maximum is obtained.

20. The deflection device according to claim 19, wherein the profile of the deflection structure is provided with a discretized shape.

21. The deflection device according to claim 19, wherein the first areas are provided with a plurality of projection shapes; wherein the different projection shapes are arranged in a repetitive order.

22. The deflection device according to claim 19, wherein the profile of the deflection structure is provided as a plurality of curved profile segments, and the plurality of curved profile segments are generated by wrapping back curve segments by $\pi$ or an integer multiple of $\pi$.

23. The deflection device according to claim 19, wherein an intensity profile is reproduced at a distance of less than $\frac{1}{16}$ of a Talbot distance.

24. The deflection device according to claim 19, wherein the parabolic phase profile does not comprise sharp-edges, or stepped portions, in the first plurality of first areas between the second plurality of second areas.

* * * * *